United States Patent [19]

Krisko

[11] Patent Number: 4,852,350
[45] Date of Patent: Aug. 1, 1989

[54] ENERGY GENERATOR

[76] Inventor: Peter Krisko, 695 Orchard St., Trumbull, Conn. 06601

[21] Appl. No.: 147,508

[22] Filed: Jan. 25, 1988

[51] Int. Cl.⁴ ............................................. F16D 31/00
[52] U.S. Cl. ........................................ 60/325; 60/721
[58] Field of Search ................ 60/325, 369, 371, 398, 60/721, 506

[56] References Cited

U.S. PATENT DOCUMENTS 4,052,849 10/1977 Dumbaugh ........................... 60/325
4,317,047 2/1982 Almada .............................. 60/506 X Primary Examiner—Stephen F. Husar
Attorney, Agent, or Firm—Kramer, Brufsky & Cifelli

[57] ABSTRACT

An energy generator includes a pendulum suspended at one end and in operative relationship with an external power device which imparts oscillation movement to the pendulum. The pendulum includes a weight disposed at one end being in operative cooperation with a hydraulic fluid cylinder to increase the hydraulic pressure of the fluid within the cylinder. A power output device receives the high pressure hydraulic fluid and generates output power. A second embodiment is directed to a power booster wherein energy is transferred between a pendulum and a power generating device.

22 Claims, 5 Drawing Sheets

ENERGY GENERATOR

While the invention is subject to a wide range of applications, it is particularly directed to an energy generator and will be particularly described in that connection. It is further within the scope of the present invention to provide a power booster for increasing the power output of an energy generator. Both the energy generator and the power booster are useful as scientific curiosities and educational devices to illustrate and teach basic operating principles of mechanical components.

It is often necessary to provide energy at a distant location from where the energy is generated. One solution is to deliver high pressure fluid to locations both near and far from the energy generator. The hydraulic fluid can power machinery such as turbine motors.

Another recurring obstacle, relating to power equipment, is to overcome the inertia associated with a turbine connected to a heavy load. Typically, a motor driven, hydraulic pressure pump delivered hydraulic fluid pressure to the loaded turbine. However, to overcome a very heavy load, it is thought to be beneficial to pulse high pressure hydraulic fluid with a high pressure surge.

In the present electronic age, the population has less understanding of the importance and operation of mechanical devices. Therefore, it would be beneficial to provide a teaching aid which demonstrates the operating principles of various mechanical components. The teaching aid would be particularly useful if it enabled students to assembly the mechanical components in a variety of configurations which demonstrate the individual or combined operation of the mechanical components. Also, with the increased sophistication of toys, it is believed useful to provide a toy illustrating mechanical principles to children.

It is a problem underlying the present invention to provide a power generating device which produces hydraulic pressure surges and/or demonstrate the operating principles of mechanical components for educational purposes.

It is an advantage underlying the present invention to provide an energy generator which obviates some of the limitations or disadvantages of the prior art.

It is an advantage of the present invention to provide an energy generator which increases the pressure of hydraulic fluid and develops pressure surges in the hydraulic fluid.

It is a further advantage of the present invention to provide an energy generator incorporating a pendulum to impact a hydraulic cylinder and increase the pressure of hydraulic fluid.

It is a still further advantage of the present invention to provide an energy generator which incorporates mechanical components including a motor, a piston and a cylinder, a pendulum, valves and a rotor.

It is a yet further advantage of the present invention to provide a power booster which transfers energy between a crankshaft and a pendulum.

Accordingly, there has been provided an energy generator which includes a pendulum suspended at one end. An external power device imparts oscillatory movement to the pendulum. A mass, disposed at one end of the pendulum, interacts with a cylinder containing hydraulic fluid and increases the hydraulic pressure of the fluid. A power output component receives the high pressure hydraulic fluid and generates output power.

A second, disclosed embodiment covers a power booster incorporating a pendulum, suspended at one end and having a mass at the other end. A power generating device imparts energy into the pendulum. A spring device, disposed in operative cooperation with the mass, imparts energy into the pendulum. An energy transfer linkage transfers energy between the pendulum and the power generating device.

A third embodiment is directed to an energy generator comprising a pendulum suspended at one end to oscillate about the point of suspension. A structure containing hydraulic fluid is disposed at the other end of the pendulum. Springs are disposed in operative cooperation with the hydraulic fluid containing structure to increase the pressure of the hydraulic fluid and to assist the pendulum in oscillating about the point of suspension. A power generator imparts oscillatory movement to the pendulum and energy transfer linkage transfers energy between the pendulum and the power generator.

The invention and further developments of the invention are now elucidated by means of the preferred embodiments in the drawings.

DETAILED DESCRIPTION OF THE PREFERRED EMBODIMENT

Figure 1:
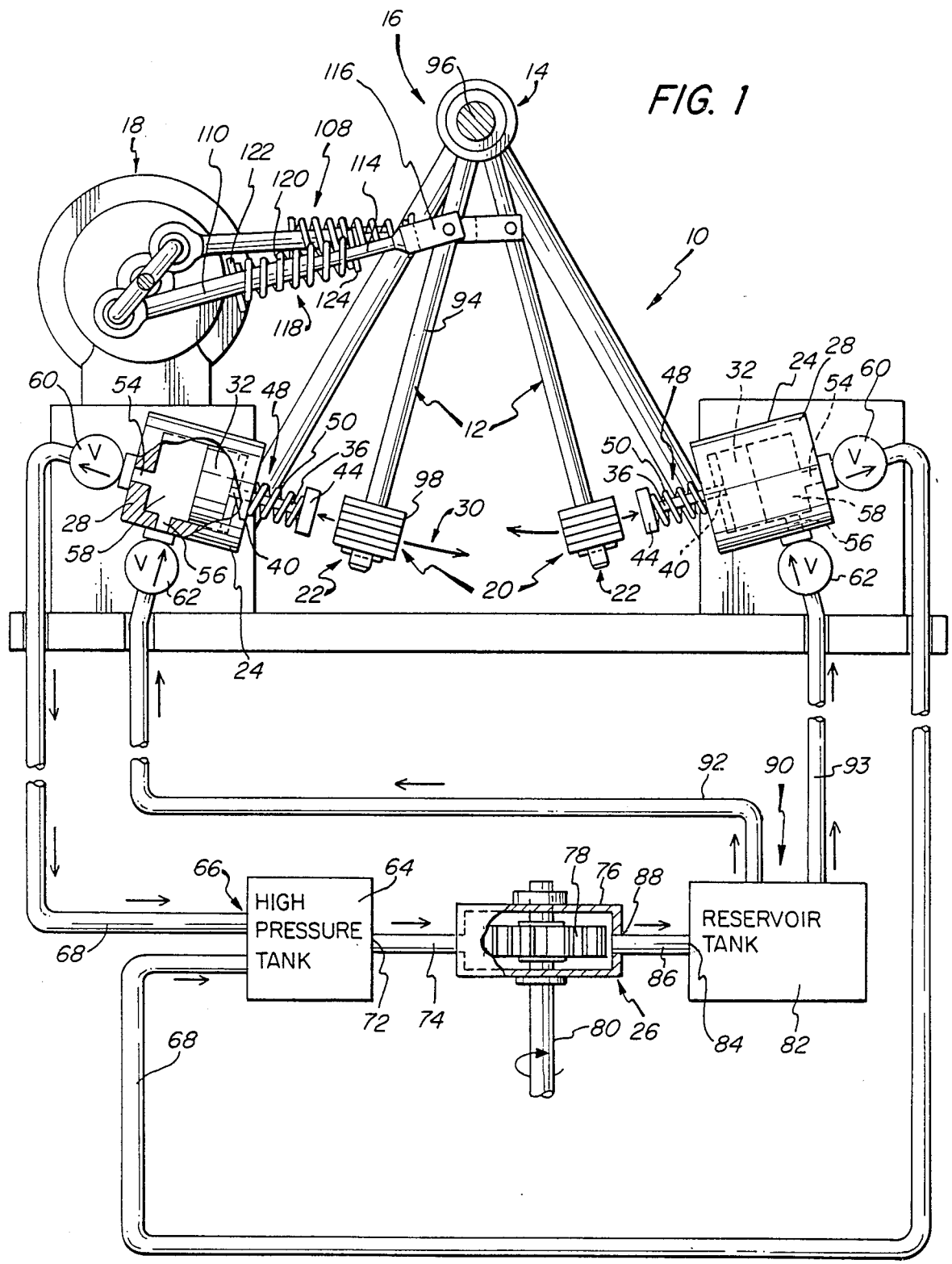
FIG. 1 illustrates an energy generator in accordance with the present invention.

An energy generator 10 is disclosed having at least one pendulum means 12 suspended at one end 14 to oscillate about the point of suspension 16. An external power means 18 imparts oscillatory movement to the pendulum means 12. Mass means 20 are connected to and disposed at the second end 22 of the pendulum means 12. A plurality of means 24, containing hydraulic fluid, are in operative cooperation with the mass means 20 to increase the hydraulic pressure of the hydraulic fluid. A power output means 26 receives the high pressure hydraulic fluid for conversion into output power.

Referring to FIG. 1, there is illustrated an energy generator 10 in accordance with the present invention. The energy generator 10 includes at least two hydraulic fluid containing devices 24. Each of the hydraulic containing devices comprises a hollow cylinder 28 containing hydraulic fluid and disposed at the end of the arc of oscillation of the pendulum devices 12. The arc of oscillation is indicated by the reference numeral 30. Each of the hollow cylinders 28 have a piston 32 fitted therein for reciprocal movement in its respective cylinder. Piston rods 36 are attached at a first end 40 of each of the piston 32. The piston rods 36 have a second end 44 projecting external to the cylinders 28. The second ends 44 are disposed for impact contact with the mass means 22 whereby the pistons 32 reciprocate in the cylinders 28. The hydraulic fluid liquid or gas, as desired.

Structure 48 is provided between each of the cylinders 28 and the second end 44 of the piston rods 36 for biasing the second ends 44 of the piston rods 36 away from their respective cylinders. The structure 48 is preferably comprised of springs 50.

The hollow cylinders 28 further include two fluid ports 54 and 56 disposed at a first end 58 of each cylinder. A first of the fluid ports 54 includes a conventional one-way valve 60 for directing hydraulic fluid flow out of the cylinder 28. A second fluid port 56 includes a second one-way valve 62 for directing hydraulic fluid flow into the cylinders 28.

A high pressure tank 64 is provided with fluid inlet port means 66 in fluid communication with the first fluid port 54 in each of the cylinders 28 through conduit structure 68. The inlet port structure 66 receives high pressure fluid for storage in the high pressure tank 64. The tank 64 includes a fluid outlet port 72 for directing high pressure fluid flow through a conduit 74 to the power output device 26.

The power output device 26 may be comprised of a rotary motor structure including a casing 76 having a turbine 78 rotably disposed therein. The turbine 78 preferably rotates a shaft 80 affixed thereto. The shaft 80 extends outside the casing 76 and provides a rotating force powered by the high pressure hydraulic fluid. The rotary force can provide a power source which can be harnessed by any conventional technique to any desired device. Although a turbine is illustrated, it is within the terms of the present invention to use any type of motor or power generator powered by a high pressure gas or fluid.

A reservoir tank 82, having an inlet port 84, is in fluid communication through a conduit 86 with an outlet port 88 of the power source 26. The hydraulic fluid passing through the power source is therefore directed into the reservoir tank 82. Tank 82 also includes reservoir outlet port structure 90 in fluid communication through conduits 92 and 93 with the fluid inlet ports 56 of the cylinders 28. It is also within the terms of the present invention to provide endless source of high pressure fluid for delivery to the inlets 56 so that the reservoir tank can be eliminated.

The pendulum structure 12 is comprised of one or more arms 94 rotably pivoted at one end about a point of suspension 16 comprising a rod or shaft 96. At the second end of the pendulum 12, a mass 20 formed of any heavy weight, such as a plurality of iron plates 98, can be affixed thereto. Any number of pendulums may be affixed to the rod 96 and each is associated with two cylinders 98, each dispersed at either end of the arc of oscillation. Preferably, the pendulums 94 are positioned on the rod 96 so that the ends 44 are imparted at spaced intervals.

Figure 2:
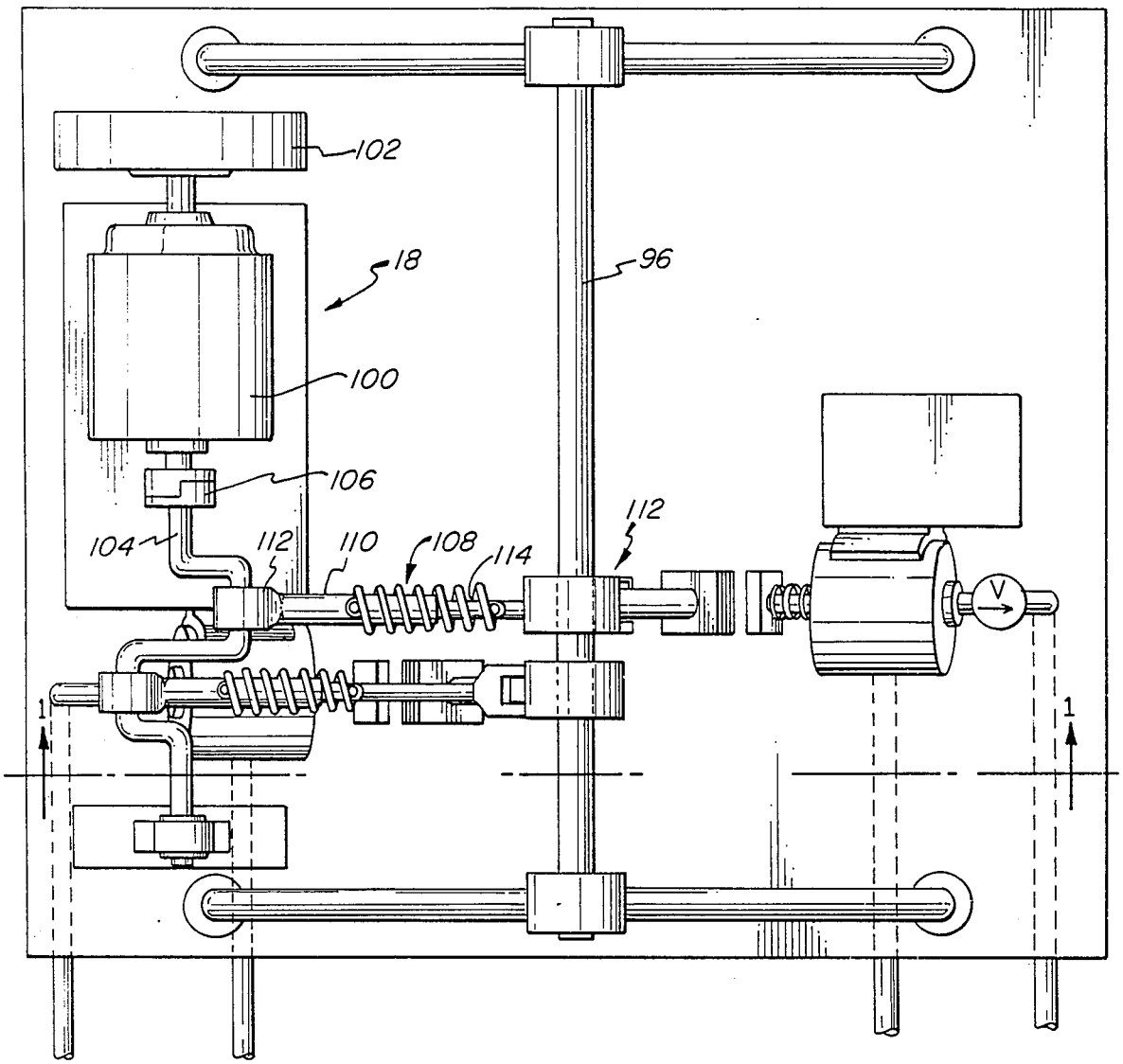
FIG. 2 illustrates a partial top view of the energy generator of FIG. 1.

In order to impart oscillatory movement to the pendulum structure 12, an external power device 18 is mechanically linked to the pendulum structure 12. Referring to FIG. 2, the external power device 18 is preferably a motor 100 which can be powered by any desired means such as, for example, gas, electricity, or steam. At one end of the motor is a flywheel 102 to ensure a constant rotational speed of crankshaft 104, irrespective of any surge loading imparted to the crankshaft 104 by the oscillating pendulums 12. Also, a slip clutch structure 106 is provided to prevent surge loading from the oscillating pendulums 12 from being transferred to the motor 100 and slowing it down or causing some damage.

The crankshaft is mechanically linked to the pendulum structure 12 by mechanically linkage 108. The mechanical linkage 108 can be constructed of a hollow rod 110 which has a bearing surface, at one end 112, journaled to the crankshaft 104. A second rod 114 is pivotably connected at one end 116 to the pendulum 94. The other end of the rod 114 reciprocates freely within the hollow rod 110. A biasing means 118 is affixed at either end to rods 110 and 114, respectively. The biasing means can comprise, for example, a spring 120 disposed between end plates 122 and 124, affixed to rods 110 and 114, respectively. As the crankshaft 104 rotates, the hollow rod 110 compresses spring 120 which, in turn, imparts movement into rod 114. Rod 114 moves the pendulum arm 94 causing it to oscillate about the point of suspension 16. The spring 120 and the free movement of rod 114 in rod 110 prevents thrust forces generated by pendulum 12 from being transferred into the crankshaft 104 as surges.

As illustrated in FIG. 1 and 2, the energy generator 10 can include two or more pendulums 12 oscillating about the rod 96. In addition, the structural layout of the energy generator 10 is schematic and may be constructed in any desired manner.

To better understand the present invention, a description of its operation follows. First, the motor 100 imparts translational movement into the linkage 108 whereby pendulums 12 oscillate about their point of suspension 16. As each pendulum reaches the end of the arc of oscillation, the mass 20 impacts the end 44 of the piston rod 36 and drives the piston 32 towards an end of the hollow cylinders 28. The pressure of the hydraulic fluid contained within the cylinders sharply increases. The high pressure hydraulic fluid opens valve 70 and flows through the conduits 68 into the high pressure tank 64. The high pressure hydraulic fluid can then be directed into a power output device 26 to rotate a shaft 80. After the hydraulic fluid passes through the power output device 26, it flows into a reservoir tank 82 and to cylinders 24 through the conduits 92 and 93. Then, the system 10 can recycle and continue operation.

After the mass 20 on the end of the pendulums 94 impacts the ends of the piston rods 36, the springs 50 are first compressed and then biased outward away from the cylinders 28. A force is thereby imparted into the mass 98 of the pendulums 94 to assist them in oscillating back towards a cylinder 24 at the other end of the arc of oscillation. Then, the mass 20 again impacts the end 44 of a piston rod 36 to repeat the cycle.

It can be understood, that the force of the spring pushing the mass away from the cylinder can impart a surge force into the pendulum which could be translated to the crankshaft 104. However, this surge force is dampened by the biasing means 118 on the mechanical linkage 108 and if necessary, by the clutch 106 provided on the crankshift adjacent the motor 100.

The energy generator 10 can provide a source of power at a location which is remote from the pendulum 94 and external power source 18. This power could be very useful in overcoming a high inertial force on the rod 80 since the surge of pressure caused by the pendulum impacting the hydraulic containing fluid structure can be translated to the rod 80.

Also, the energy generator 10 could provide a very useful scientific curiosity or device for providing educational instruction. For example, a number of variables may be changed and observed, such as changing the amount of mass at the ends of the pendulums, changing the fluid used for the hydraulic pressure and increasing the number of pendulums in the system. Moreover, the instructional value of the present invention is not limited to the described variations but may include any desired change of any component. Moreover, the energy generator 10 may be adapted as a toy for a child or an adult wherein the mechanical action between the components can be observed.

Figure 3:
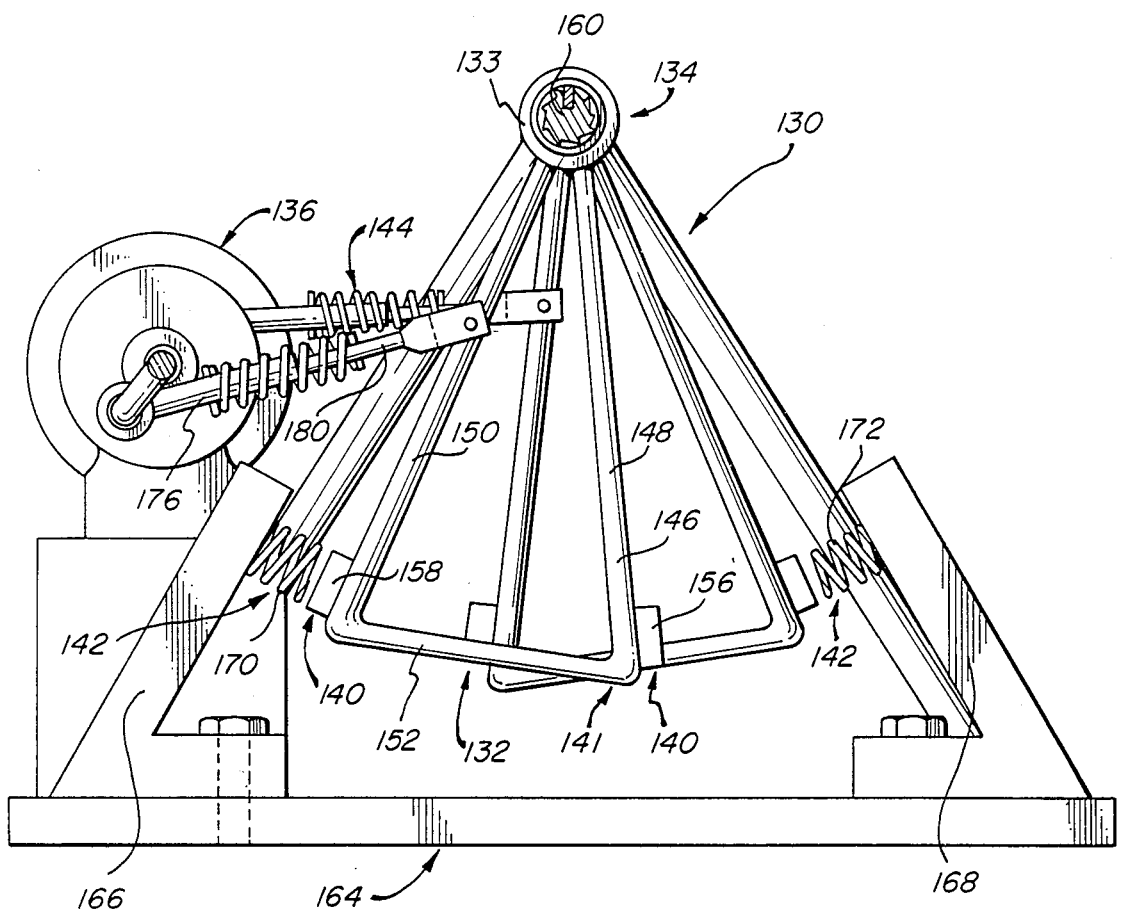
FIG. 3 illustrates a power booster in accordance with the present invention.
Figure 4:
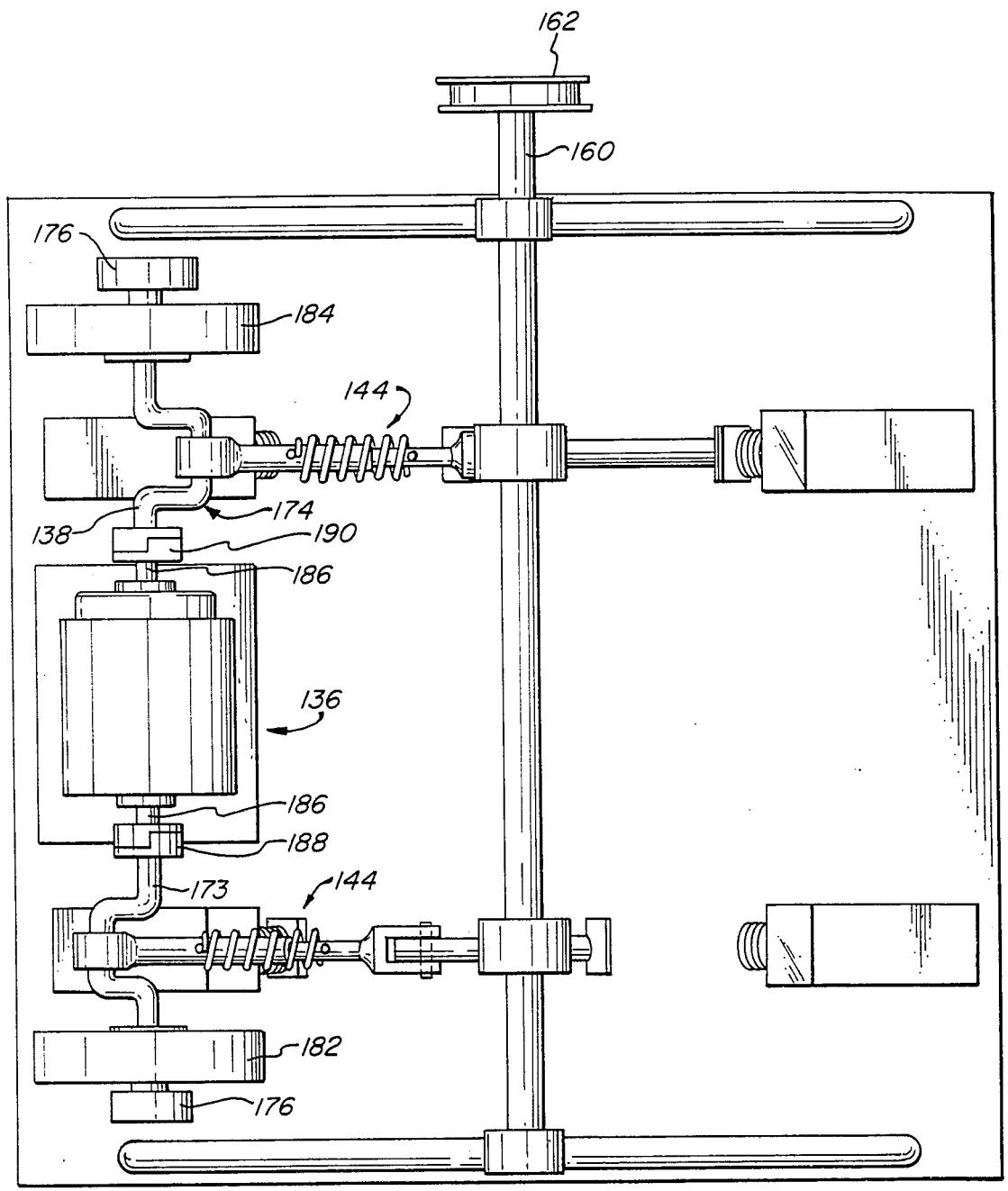
FIG. 4 illustrates a top view of the power booster of FIG. 3.

A second embodiment of the present invention as illustrated in FIGS. 3 and 4 is directed to a power booster 130 comprising at least one pendulum device 132 suspended at one end 133 to oscillate about the point of suspension 134. A power generating device 136 rotates a crankshaft structure 138. A mass component 140 is connected to at least one end 141 of the pendulum structure 132. A spring structure 142 is disposed in operative cooperation with the mass 140 to impart energy into the pendulum structure 132 and to assist the pendulum structure in oscillating about the point of suspension 134. An energy transfer linkage device 144 is disposed between the pendulum structure 132 and the crankshaft structure 138 for transferring energy between the pendulum structure 132 and the crankshaft structure 138.

Referring to FIG. 3, there is illustrated the power booster 130. A pendulum structure 132 preferably comprises a triangularly shaped component 146 formed of three structural elements 148, 150 and 152. Two of the structural elements 148 and 150 are joined at a first end which oscillates about the point of suspension 134. The third element 152 is joined between the ends of the two elements 148 and 150. Although the pendulum structure is preferably of a triangular shape, it is within the terms of the present invention to form the pendulum of a single structural element or with any other combination of elements of a desired shape such as, for example, with a circular or oblong shape.

A mass component 140 comprises first and second mass structures 156 and 158 affixed adjacent the second ends of the first and second structural elements 148 and 150, respectively. The mass components 156 and 158 can be formed of any desired material to provide the desired weight and can be attached to the pendulum in any desired manner such as, for example, by bolting or welding.

The end 133 of the pendulum structure 132 is preferably circular and is journaled about a rod or shaft 160. Preferably the circular end 133 is interconnected to the rod 160 by a rachet means whereby oscillation of the pendulum about the point of suspension 135 in one direction causes rotation of the rod or shaft 160. Whereas, when the pendulum structure 132 oscillates in the other direction, the shaft 160 remains stationary. The oscillatory motion of the pendulum structure 132 rotates the shaft component 160 to provide a supplemental power source. As seen in FIG. 4, the end of the rod 160 may be attached to a pulley 162 which is capable of delivering power by any conventional means such as, for example, a pulley to a desired power driven structure (not shown). It is also within the terms of the present invention, to substitute a different drive structure for pulley 162 such as, for example, a gear system.

The power booster 130 includes a structural frame 164 having first and second frame components 166 and 168 disposed on opposite sides of the arc of oscillation of the pendulum structure 132. The spring device 142 includes spring elements 170 and 172 attached to the structural components 166 and 168, respectively. The spring elements 170 and 172 are positioned on the frame components so that oscillation of the pendulum structure 132 causes an impact between the mass elements 156 and 158 and the spring elements 172 and 170. The impact between the mass elements and the spring causes the latter to compress. Then, as the pendulum oscillates away from one of the springs, the latter expands and imparts energy into the pendulum. This energy is transferred through the linkage 144 to boost the power output of the motor 136. As seen in FIGS. 3 and 4, two pendulums 146 are illustrated and it is within the terms of the present invention to provide any number of pendulums as desired.

In order to initiate the oscillation of the pendulums, a power generator 136 such as a motor may be provided. The power generator 136 may be operated by any means such as gas, electricity, or steam. As best seen in FIG. 4, the power generator is connected to crankshafts 173 and 174. These crankshafts have pulleys 175 and 176 at their ends for delivering power to a machine. Although pulleys are illustrated, it is also within the terms of the present invention to use any other conventional power drive mechanism, such as gear systems. Flywheels 182 and 184 are also affixed to the crankshafts to maintain a relatively constant rotation of the drive rods 186 extending from the motor. Clutch devices 188 and 190 are disposed between the drive rods 186 and the crankshafts 174 and 176 to prevent any surge of power from damaging the power generator 136.

The crankshafts are journaled to energy transfer linkage devices 144. The transfer linkage devices 144 include two connector components 178 and 180. The energy transfer linkage 144 can be of an identical construction as the linkage 108 illustrated in FIGS. 1 and 2 and described hereinbefore. The transfer linkage 144 serves a significant role in the present invention by imparting the oscillatory motion to the pendulum structures 132. Also, after the pendulums impact the spring devices 142 and are biased back through their arcs of oscillation, the transfer linkage mechanisms 144 can deliver surge power back to the crankshaft 173 and 174.

Figure 5:
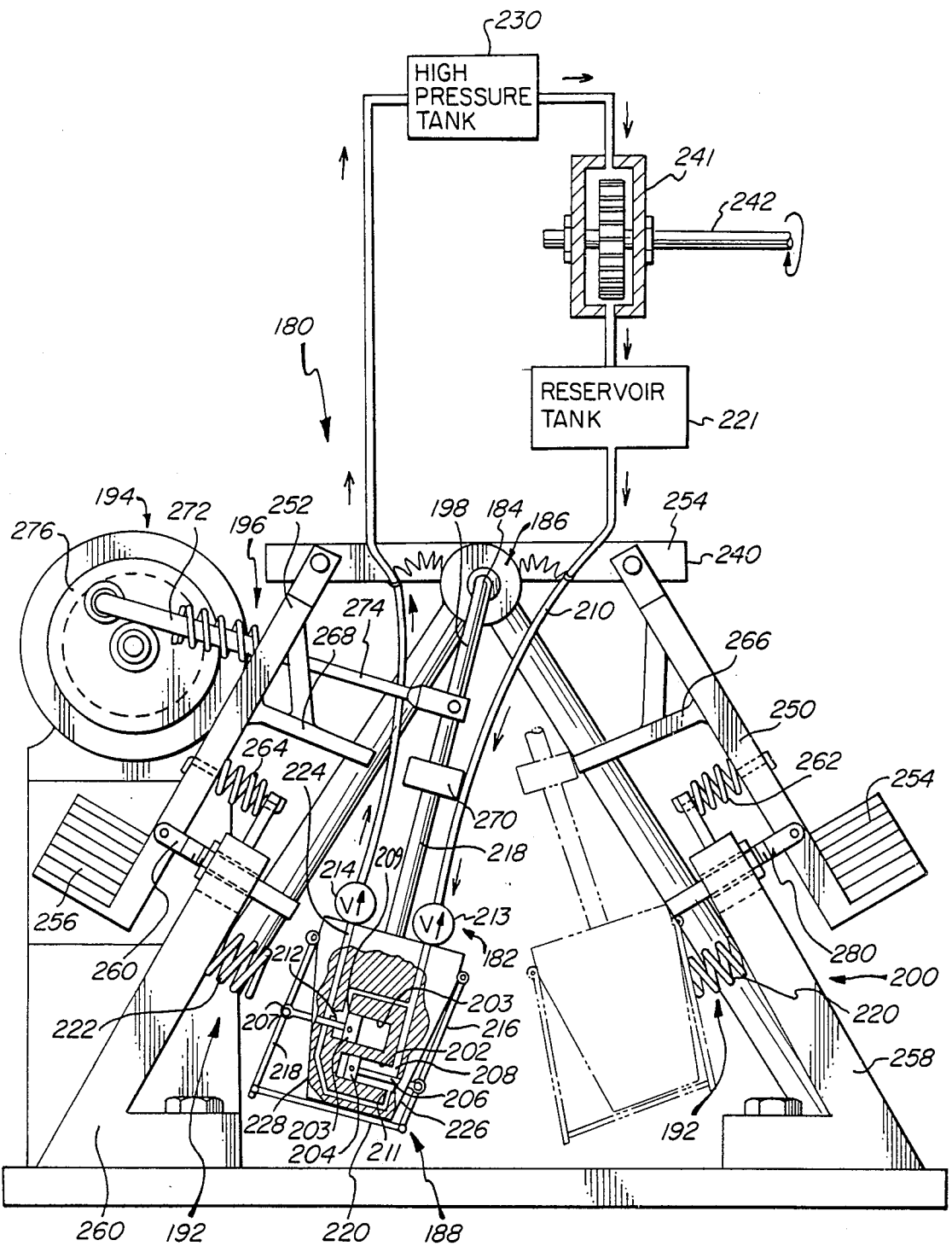
FIG. 5 illustrates an energy generator incorporating a pendulum containing pressure generating pistons.

The better understand the second embodiment of the present invention, a description of the operation of the system illustrated in FIGS. 4 and 5 is provided. First, the power generator 136 is switched on and rotates crankshafts 173 and 174. This rotation causes a translational movement of the linkage arms 144. This movement is directed into the pendulum components 132 and causes them to oscillate about a point of oscillation 133. As the pendulum reaches the end of the arc of oscillation, the mass 140 impacts against and compresses spring 172. Then, the spring 172 expands and imparts energy into the pendulum causing the latter to swing back until the mass 140 impacts the spring 170. Again the spring contracts and upon its expansion, imparts energy into the pendulum. In this way, the system continues to recycle. It is an important aspect of the present invention that the power generator 136 continues to provide energy to oscillate the pendulum. To reduce problems associated with timing, the energy transfer linkage 144 is affixed between the energy generator and the pendulum with a biasing element, i.e. a spring. The transfer linkage accommodates any unsynchronized movement between the pendulum and the power generator.

As the energy imparted into the pendulums by the springs is transferred into the crankshaft, extra surge power can be provided in the crankshaft. The surge can be added to the output of the motor 136. For example, the surge power can be delivered to the pulleys 175 and 176.

Also, the rotation of the rod 160 provides a source of power which can be delivered by pulley 162 to any desired power driven structure in a conventional manner.

The energy generator 130 could also provide a very useful scientific curiosity or device for providing educational instruction. For example, a number of structural components can be exchanged and the resulting effect can be observed. For example, the mass at the ends of the pendulums, the fluid used for the hydraulic pressure, and the number of pendulums in the system can be independently changed. Moreover, the instructional value of the present invention is not limited to the described variations but can include an exchange of any structural component. Also, the energy generator 130 can be adapted as a toy for a child or an adult wherein the mechanical action between the components can be observed.

A third embodiment of the present invention, as illustrated in FIG. 5, relates to an energy generator 180 comprising at least one pendulum device 182 suspended at one end 184 about the point of suspension 186. Structure 188 for containing hydraulic fluid is disposed at a second end 190 of the pendulum device 182. Spring means 192 are disposed in operative cooperation with the hydraulic fluid containing structure 188 to increase the pressure of the hydraulic fluid and to assist the pendulum 182 in oscillating about the point of suspension 186. Power generating means 194 imparts oscillating motion to the pendulum 182. Energy transfer linkage means 196 is disposed between the pendulum structure 182 and the power generating means 194 for transferring energy therebetween.

Referring to FIG. 5, there is illustrated the energy generator 180. A pendulum structure 182, preferably comprising a single arm component 198, is pivotably connected at one end 184 to an energy generator supporting structure 200 to allow oscillation about the point of suspension 186.

A structural component 188 for containing hydraulic fluid is preferably connected to the second end 190 of the arm component 198. The structural component 188 for containing the hydraulic fluid includes at least two fluid cylinders 202 and 203. Each cylinder receives and discharges conventional hydraulic fluid, such as liquid or gas. A piston 204, 205 is fitted in each of the fluid cylinders 202, 203 respectively for reciprocating therein. Piston rods 206 and 207 are attached at a first end to pistons 204 and 205, respectively, and have a second end projecting external to the structural component 188 for impact contact with the spring structure 192. Each of the cylinders 202 and 203 include an inlet 208, 209 for receiving hydraulic fluid from a conduit 210. The cylinders 202 and 203 each also contain an output port 211, 212. Both the inlet ports 208, 209 and the outlet ports 211, 212 have a one-way valve 213, 214 respectively, associated therewith to restrict the direction of flow of the hydraulic fluid as will be explained hereinafter.

The structural component 188 further includes impact plates 216 and 218 each pivotably connected at one end to the structure 188. The other ends of the plates 216 and 218 are pivotably connected with a connecting rod 220. In operation, when the structure 188 pivots about the point of suspension 186, plates 216 and 218 impact against springs 220 and 222 respectively and cause pistons 204 and 205 to reciprocate in the cylinders 202 and 203. As each piston 204 and 205 moves away from their respective cylinder inlets 208 and 209, hydraulic fluid is drawn into the cylinders 202 and 203 through flow line 110 and valve 213. Conversely, as the pistons 204 and 205 move towards cylinder outlets 211 and 212, the pressure of the hydraulic fluid confined within the cylinders 202 and 203 increases and forces the fluid through flow line 224 and across one-way valve 214.

The impact plates 216 and 218 are connected by the rod 220 so that the plates 216 and 218 move in unison with each other. When plate 216 or 218 impacts springs 220 or 222, respectively, the spring compresses and the plate 216 or 218 moves against the side wall 226 or 228 of the structure 188. The plate movement causes the pistons 204 and 205 to reciprocate in their respective cylinders.

Referring again to FIG. 5, plate 218 impacts spring 222 causing the spring to compress. At the same time, piston 204 moves towards outlet 211 and compresses the hydraulic fluid until it reaches a sufficient pressure to open valve 214 and flow to high pressure tank 230. Piston 205 reciprocates, concurrently, to draw fluid through inlet 209. This movement of pistons 204 and 205 draws hydraulic fluid from the reservoir tank 221 into the cylinders through line 210 while expelling high pressure to the high pressure tank 230.

An additional aspect of the energy generator illustrated in FIG. 5 relates to the structure to provide a delayed action force on the pendulum 188 to help it reverse direction. The structure comprises two pivotably connected arms 250 and 252. Each of the arms is pivotably connected to a structural element 254. The arms each include a weight 254 and 256 disposed at one end. Also, a rod 258 and 260 is connected to the arms 250 and 252, respectively, and reciprocally received within a passageway provided in the structural elements 258 and 260. Arms 266 and 268 project from the elements 250 and 252, respectively, and are positioned to contact an impact plate 270 which is affixed to the pendulum arm 218.

In order to initiate oscillation of the pendulum 182, a power generator 194 such as a motor may be provided. The power generator may be operated by any means such as gas, electricity or steam. The power generator is connected to the pendulum by an energy transfer linkage device 196. The linkage device includes two connectors 272 and 274. The energy transfer linkage device can be of a similar construction to the linkage 108 illustrated in FIGS. 1 and 2 and described hereinbefore. In FIG. 5, the linkage device is connected to a flywheel structure 276 and is pivotally connected at both ends to the flywheel 276 and the pendulum 198. The transfer linkage device serves a significant role in the present invention by imparting oscillatory motion to the pendulum structure 188.

To better understand the third embodiment of the present invention, a description of the operation is provided. First, the power generator 194 is switched on and provides translational movement of the linkage arm 196. This movement causes the pendulum 198 to oscillate about a point of oscillation 186. As the pendulum reaches one end of the arc of oscillation, the plate 216 impacts against and compresses the spring 220, as shown partially in phantom. Arm 260 puts spring 264 into tension. The impact of plate 218 moves the pistons 204 and 205 in their cylinders causing high pressure fluid flow into high pressure tank 230. At the same time, hydraulic fluid is drawn into cylinder 203 from tank 221. Then, the spring 222 expands and imparts energy into the pendulum 198 causing the latter to swing back. Also, the weight 256 and the relaxation of spring 264 causes rod 268 to contact the impact plate 270 and rod 280 to contact the wall 228. The contact of rods 268 and 280 are slightly delayed to impart a force into the pendulum after the force from spring 222 has substantially subsided. Then, the plate 216 contacts the spring 220, as shown in phantom, and forces the pistons in the cylinders to move in the opposite direction within their respective cylinders. High pressure fluid from cylinder 203 flows to high pressure tank 230 while hydraulic fluid from tank 221 is directed into cylinder 202.

The high pressure tank 230 directs the pressurized fluid into a power output device 241 which is essentially identical to the power output device 26 described hereinbefore. The shaft 242 projecting out of the output device 241 provides a rotating force which is powered by the high pressure hydraulic fluid. The rotary force can provide a power source which can be harnessed by any conventional technique to any desired device. Although a turbine is illustrated, it is within the terms of the present invention to use any type of motor or power generator capable of being powered by a high pressure gas or fluid.

The energy generator 180 could also provide a very useful scientific curiosity or device for providing educational instruction. For example, a number of structural components can be varied and the resulting effect can be observed. Examples include the amount of weight at the ends of the pendulums on the rods 250, 252, the type of fluid used for the hydraulic pressure, and the number of pendulums, and the size of the springs, etc. Moreover, the instructional value of the present invention is not limited to the described variations but can include an exchange of any structural component. Also, the energy generator 180 can be adapted as a toy for a child or an adult wherein the mechanical action between the components can be observed.

It is apparent that there has been provided in accordance with this invention an energy generator and power boosters which satisfy the objects, means and advantages set forth hereinbefore. While the invention has been described in combination with the embodiments thereof, it is evident that many alternatives, modifications and variations will be apparent to those skilled in the art in light of the foregoing description. Accordingly, it is intended to embrace all such alternatives, modifications and all variations as fall within the spirit and broad scope of the appended claims.

What is claimed is:

1. A power booster, comprising at least one pendulum means suspended at one end to oscillate about the point of suspension;
   power generating means;
   mass means connected to one end of the said pendulum means;
   spring means disposed in operative cooperation with said mass means to impart energy into said pendulum means and assist the pendulum means in oscillating about the point of suspension; and
   energy transfer linkage means between said pendulum means and said power generating means for transferring energy between said pendulum means and said power generating means.

2. The power booster of claim 1 wherein said transfer linkage means includes two connector components, one of said components being affixed to said pendulum means and the second of said components being affixed to said power generating means; and
   biasing means interconnecting said first and second connector components.

3. The power booster of claim 2 wherein said spring means comprises at least two spring elements; each of the spring elements disposed on opposite sides of the arc of oscillation of the mass means to compress during impact with the mass means and to expand to impart energy to said pendulum means.

4. The power booster of claim 3 including a structural frame having first and second frame members disposed on either side of the arc of oscillation of the pendulum means, said first and second frame members each having one of the first and second spring elements affixed thereto for contacting the mass means of said pendulum means.

5. The power booster of claim 4 wherein said pendulum means comprises:
   a triangularly shaped structure formed of three elements;
   two elements of said triangularly shaped structure are joined at one end to the point of suspension;
   a third element is joined between the second ends of each of the two elements; and
   said mass means comprises first and second weight structures affixed adjacent the second ends of the first and second elements, respectively.

6. The power booster of claim 5 including a rotating structural component to which said at least one pendulum means is attached at the point of suspension;
   means connecting said at least one pendulum means to said rotating structural component whereby oscillatory motion of said at least one pendulum means rotates said structural component to provide a supplemental power source.

7. The power booster of claim 6 wherein said power generating means comprises a motor operating a crankshaft.

8. The power booster of claim 7 including clutch means between said motor and said crankshaft to absorb energy pulses imparted to said crankshaft by said transfer linkage.

9. The power booster of claim 8 including a plurality of pendulum means.

10. The energy generator of claim 1 comprising a scientific curiosity being adapted for educational instruction.

11. An energy generator, comprising
    at least one pendulum means suspended at one end to oscillate about the point of suspension;
    means for containing hydraulic fluid disposed at a second end of said pendulum means;
    spring means disposed in operative cooperation with the hydraulic fluid containing means to increase the pressure of the hydraulic fluid and to assist the pendulum means in oscillating about the point of suspension;
    power generating means for imparting oscillatory movement to said pendulum means; and
    energy transfer linkage means between said pendulum means and said power generating means for transferring energy therebetween.

12. The energy generator of claim 11 wherein said means for containing hydraulic fluid further comprises:
    a structural component having a plurality of fluid cylinders each adapted to receive hydraulic fluid;

a piston fitted in each of said fluid cylinders for reciprocating movement therein;

piston rods attached to a first end of each of said pistons and having a second end projecting external to said structural component for impact contact with said spring means.

13. The energy generator of claim 12 wherein said structural component further includes two plates, each pivotably connected at one end to said structural component and disposed for impact contact with said spring means, each of said plates being connected to one of the second ends of said pistons whereby movement of said plates causes said pistons to reciprocate in said cylinders.

14. The energy generator of claim 13 wherein said structural component further includes rod means connected between said plates whereby said plates move simultaneously.

15. The energy generator of claim 14 wherein each of said hollow cylinders further includes two fluid ports disposed at a first end of the cylinder;

a first of the fluid ports having a first one way valve for directing hydraulic fluid flow out of the hollow cylinder; and a second of the fluid ports having a second one way valve for directing hydraulic fluid flow into the hollow cylinder.

16. The energy generator of claim 15 wherein said spring means comprises at least two spring elements; each of the spring elements disposed on opposite sides of the arc of scillation of the mass means to compress during impact with the mass means and to expand to impart energy to said pendulum means.

17. The energy generator of claim 16 including a structural frame having first and second frame members disposed on either side of the arc of oscillation of the pendulum means, said first and second frame members each having one of the first and second spring elements affixed thereto for contacting the mass means of said pendulum means.

18. The energy generator of claim 17 further including a high pressure tank having a first tank fluid inlet port means in fluid communication with each of said cylinders for receiving high pressure fluid and a tank fluid outlet port for directing high pressure fluid flow to said power output means.

19. The energy generator of claim 18 further including a reservoir tank having an inlet port in fluid communication with said power output means to receive hydraulic fluid from said power output means; and said reservoir tank having an reservoir outlet port means in fluid communication with the first and second cylinders.

20. The energy generator of claim 19 wherein said external power means comprises a motor being mechanically linked to said pendulum means for imparting the oscillating movement to the pendulum means.

21. The energy generator of claim 17 further including power assist means pivotably attached to said structural component for providing an additional force to cause the pendulum means to oscillate about the point of oscillation.

22. The energy generator of claim 21 wherein the power assist means operates to provide the additional force after the force from said spring elements has been substantially absorbed in said pendulum means.

* * * * *